Oct. 1, 1963     W. A. WILLIAMSON     3,105,673
TRAILER WITH ELEVATABLE BED

Filed May 17, 1961     2 Sheets-Sheet 1

*INVENTOR.*
WILLIAM A. WILLIAMSON
BY
ATTORNEY

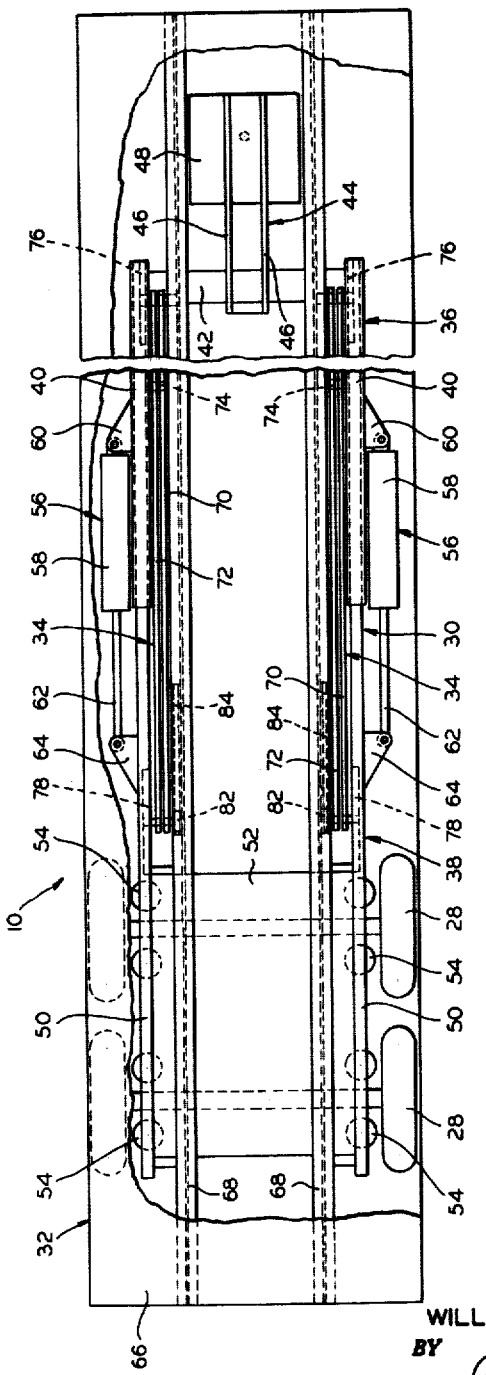

United States Patent Office 3,105,673
Patented Oct. 1, 1963

3,105,673
TRAILER WITH ELEVATABLE BED
William A. Williamson, Battle Creek, Mich., assignor to Clark Equipment Company, a corporation of Michigan
Filed May 17, 1961, Ser. No. 110,759
3 Claims. (Cl. 254—8)

This invention relates to elevating trailer mechanism, and more particularly to such a mechanism having a telescoping sub-frame.

Tractor drawn trailers and the like have heretofore utilized various means to elevate the platform or bed of the trailer. Of these various elevating means those utilizing scissors or like mechanism have commonly elevated the trailer bed above a fixed sub-frame by actuation of one end of the scissors mechanism along the sub-frame. Such construction requires relatively strong and durable sub-frame members for the reason that movement of the one end of the scissors mechanism as aforesaid is toward the center of the trailer which means that the location of load application moves away from the location of load reaction (the trailer wheels) as the platform is elevated. It is a principal object of my invention to provide an improved elevating trailer construction which utilizes relatively light sub-frame supporting members.

Another object of the invention is to provide a wheeled load lifting device having an elevatable platform and a telescoping supporting frame.

A further object of the invention is to provide an improved cargo handling tractor-trailer unit having an elevatable trailer bed wherein the trailer supporting structure decreases its effective length in a common plane during elevation of the trailer bed.

A further object of the invention is to provide a generally improved elevating trailer device of relatively simple and rugged construction.

In carrying out my invention I provide a wheel supported telescoping sub-frame trailer assembly having an elevatable trailer bed or platform supported thereon by elevating mechanism such that telescoping of the sub-frame causes the trailer bed to be elevated.

The above and other objects, features and advantages of my invention will become more readily apparent from the following detailed description taken in conjunction with the drawings wherein:

FIGURE 3 is an enlarged plan view of FIGURE 1 showing the trailer bed partially broken away.

Figure 1:
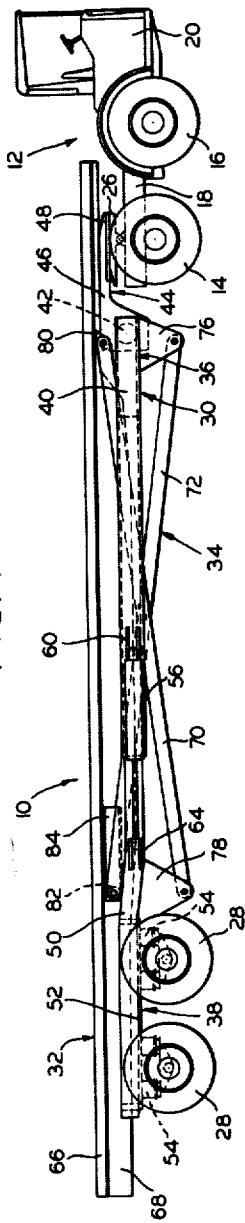
FIGURE 1 is a side elevational view of a tractor-trailer unit embodying my invention wherein the trailer bed is shown in its lowered position.

Referring now in detail to the drawings, the reference numeral 10 designates a trailer constructed according to my invention and attached to a tractor 12 which comprises a pair of rear drive wheels 14 and a pair of forward dirigible wheels 16 (one of each of which pairs is shown) supporting a tractor frame 18 and an operator's station 20. A fifth wheel 26 of known construction is mounted on frame 18 and is adapted for pivotal connection with the trailer 10 in a well known manner.

The trailer 10 comprises generally a pair of ground engaging wheel and axle assemblies 28, a telescoping main frame or sub-frame assembly 30 supported at one end by the wheel and axle assemblies 28 and at the opposite end by the tractor 12, a load supporting platform or trailer bed assembly 32, and a pair of generally longitudinally disposed, tranversely spaced scissors-like mechanisms 34 interconnecting the sub-frame 30 and trailer bed 32 and actuatable to elevate the bed 32 in a manner to be described.

The main frame assembly 30 comprises first and second sub-assemblies 36 and 38 arranged for longitudinal movement relative to each other. Sub-assembly 36 comprises a pair of transversely spaced and longitudinally extending hollow frame members 40, preferably square in cross section, interconnected by a transverse tubular brace member 42 at the forward ends thereof. A "gooseneck" hitch 44 of known construction for attaching the trailer 10 to the fifth wheel comprises a pair of longitudinally extending, tranversely spaced plates 46 secured, as by welding, adjacent the one ends thereof to the center portion of tubular member 42, and a skid plate 48 attached to the bottom edges of plates 46 adapted for registry with the fifth wheel in known manner. Additional details of the hitch and fifth wheel construction will not be described since it is conventional and comprises no part of the present invention. Sub-assembly 38 comprises a pair of longitudinally extending, transversely spaced hollow frame members 50 which are of the same cross-sectional shape as members 40 but somewhat smaller in area being adapted to register with and telescope within members 40, and a transverse support plate 52 which interconnects members 50 to form a rigid rear sub-assembly of the main frame 30. The sub-assembly 38 is supported upon the pair of wheel and axle assemblies 28 by means of, for example, conventional air spring suspension units 54 mounted in pairs between support plate 52 and adjacent each wheel of assemblies 28.

Frame sub-assemblies 36 and 38 are secured together for telescoping movement by means of a pair of double-acting fluid actuators 56. These actuators may conveniently be of pneumatic type cylinder-piston construction and connected via valve control means, not shown, to the source of pressurized air for operation of air brakes and air suspension units. Each actuator 56 comprises a cylinder 58 located transversely outwardly of frame member 40 and pivotally connected thereto at one end of the cylinder by means of a frame connected pin and bracket assembly 60, and a rearwardly extending piston rod 62 pivotally connected at its end to frame member 50 by means of a pin and bracket assembly 64. The connection of actuators 56 to frame members 40 and 50 could, of course, be reversed. In the interest of clarity of drawing, conduits for connecting actuators 56 with a source of pressurized fluid, a sump and control means therefor have been omitted from the drawings for the reason that such structure is conventional. It will be appreciated that cylinders 58 may be connected to a source of pressurized fluid by a conduit connection adjacent each end of each cylinder, and that control means for energizing the fluid actuators 56 may be located, for example, in the tractor 12.

Figure 2:
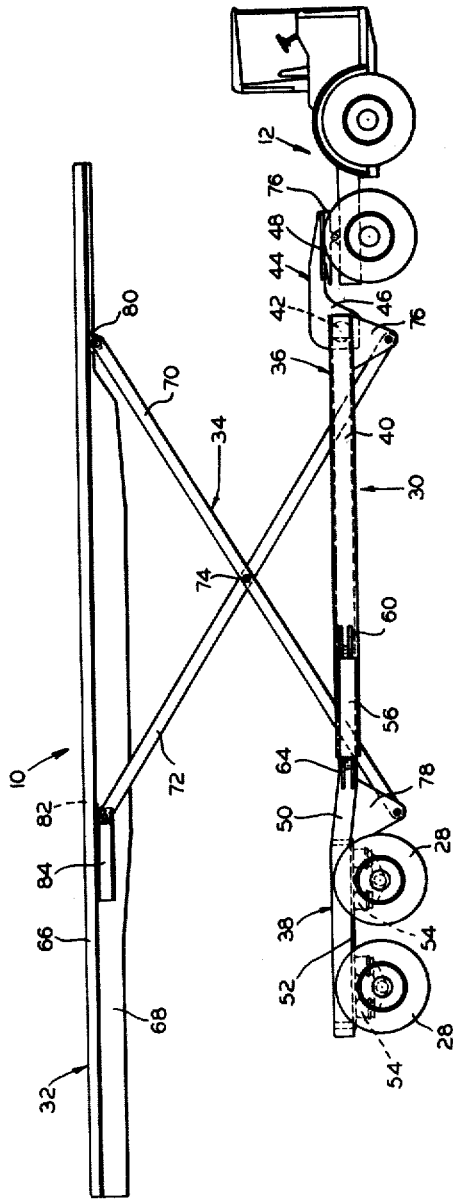
FIGURE 2 is a view similar to FIGURE 1 wherein the trailer bed is located in its elevated position.

The trailer bed or platform 32 is disposed longitudinally of and above the telescopical sub-frame 30 and is supported thereby when in a lowered position, as shown in FIG. 1. The bed 32 comprises a load support platform 66 which is carried by a pair of longitudinally extending and transversely spaced modified T-beam stringer members 68. The configuration of stringer members 68 is best seen in FIG. 2.

The trailer bed 32 and sub-frame 30, as stated above, are interconnected by a pair of transversely spaced, longitudinally extending scissors-like mechanisms 34. Each scissors mechanism comprises a pair of lever arms 70 and 72 which are pivotally connected centrally of their ends by a heavy pin 74. The forward end of each lever arm 72 is pivotally connected below frame member 40 to a downwardly extending bracket 76 which is attached to the forward end of each frame member 40. Similarly, the rearward end of each lever arm 70 is pivotally connected to a downwardly extending bracket 78 which is attached to each frame member 50 just forwardly of the wheel and axle assemblies 28. The upper end of each lever arm 70 is pivotally connected to and beneath trailer bed 32 by means of a bracket 80 which is attached to each stringer member 68 vertically above brackets 76 so that the forward pivotal connections of each pair of lever arms 70 and 72 are always in vertical alignment. The rearward end of each lever arm 72 is connected to and beneath trailer bed 32 such that it can move longitudinally of bed 32 between two limiting positions. This connection comprises a roller 82 which is rotatably mounted at the rearward end of each lever arm 72 and arranged to roll in a longitudinally disposed C-shaped channel member 84 which is fixedly attached in a predetermined location along the outer side of each stringer member 68.

Turning now to the operation of my invention, let it be assumed that a load carried upon the bed of trailer 10 is desired to be loaded into an airplane through a cargo hatch which is located a substantial distance above the ground and that the rear edge of trailer 10 is located directly beneath the airplane cargo hatch in a lowered position. The operator through the control means energizes fluid actuators 56 to retract piston rods 62 which actuates the entire sub-assembly 38 and wheel and axle assemblies 28 forwardly as frame members 50 telescope within frame members 40, thereby decreasing the length of trailer bed 30 which causes brackets 76 and 78 to be moved closer together. Such shortening of the trailer bed causes the scissors mechanisms 34 to be actuated from the lowered position of FIGURE 1 toward the fully raised position of FIGURE 2 wherein the trailer bed 32 is located in a horizontal plane for unloading operations through the cargo hatch. During such elevation of the trailer bed the roller end 82 of each lever arm 72 is actuated from its rearward limited position in channel 84 to its forward limited position in such a manner that the rearward pivoted ends of each pair of connected lever arms 70 and 72 remain always in substantially vertical relation; i.e., the connection of arm 70 to bracket 78 moves forwardly as the sub-frame telescopes at the same rate as roller 82 moves forwardly in channel 84. Since arms 70 and 72 are pivoted together centrally thereof by pin 74, and the forward ends of the arms are fixed in a longitudinal direction it will be seen that trailer bed 32 will remain under all conditions of operation in a plane substantially parallel to the supporting surface of the trailer. Also, of course, my invention provides for vertical movement of the trailer bed without any corresponding longitudinal movement.

An important feature of my invention involves the maintenance of a constant relationship between all locations of load application to the trailer sub-frame and the wheels supporting the sub-frame. Thus, irrespective of the elevation of the trailer bed, the points of connection of the lever arms 70 and 72 are always the same distance from wheel and axle assemblies 28 and wheels 14, respectively. In other words, these points of load application to the brackets 78 and 76 are always in fixed close spaced relation to the load reaction points, i.e., the wheel and axle assemblies 28 and wheels 14, respectively. Thus, the stresses in the sub-frame are always held to a minimum which is highly desirable since this permits utilization of a lighter sub-frame construction than would be possible if the location of load application moves away from the location of load reaction, as heretofore, during elevation of the load.

Although only one embodiment of this invention has been described herein, various modifications and changes in the form, structure and relative arrangement of parts will be apparent to those skilled in the art. For example, a van-type trailer could be as equally well used as the flatbed-type trailer which I have disclosed. Also, various means other than fluid actuators for actuating the telescoping sub-frame will readily occur, such as a motor driven rack and pinion assembly connected between the sub-assemblies 36 and 38. Therefore, I intend to be limited only by the scope and spirit of the claims appended.

I claim:

1. A trailer comprising a sub-frame having first and second frame portions, said first frame portion including a pair of transversely spaced, longitudinally extending frame members, a transverse member connecting said frame members adjacent the forward ends thereof, wheeled means supporting said first frame portion forwardly of said transverse member, said second frame portion including a pair of transversely spaced, longitudinally extending frame members, a transverse member connecting said frame members adjacent the rearward ends thereof, said first and second pairs of frame members telescopically interfitting with each other such that one of said frame portions is movable longitudinally relative to the other of said frame portions and forms therewith a relatively large opening in said sub-frame, fluid actuator means connected between said first and second frame portions for moving one of said frame portions longitudinally relative to the other of said frame portions, elevatable load carrying means disposed about said sub-frame, and elevating mechanism secured to said load carrying means and to each of said first and second frame portions adjacent and below said forward and rearward transverse members, said elevating mechanism being disposable within said opening when collapsed so that said load carrying means is supported upon said frame portions, telescopical movement of said first and second frame portions effecting elevating movement of said mechanism and load carrying means and extending movement thereof effecting lowering movement of said mechanism.

2. A load handling device comprising frame means having a first frame portion and a second frame portion connected thereto, said first frame portion including a first pair of laterally spaced, longitudinally extending hollow frame members and a transverse brace member connecting said first pair of frame members, said second frame portion being supported by ground engaging means and including a second pair of laterally spaced, longitudinally extending hollow frame members and a transverse support plate connecting said second pair of frame members, said first and second pairs of frame members being telescoped for relative longitudinal movement, said first and second pairs of frame members, said brace member and said support plate defining an opening therebetween, load engaging means disposed above said frame means, a pair of transversely spaced scissors mechanisms interconnecting said frame means and said load carrying means and disposable within said opening when collapsed, each said scissors mechanism having first and second lever arms, said first lever arms being pivotally connected to said first frame portion and said second lever arms being pivotally connected to said second frame portion, and a pair of double acting fluid actuators extending longitudinally of said frame portions and connected to said first and second frame portions for telescoping the same whereby to actuate said pair of scissors mechanisms to elevate said load engaging means.

3. A wheeled trailer for use with a tractor comprising a telescoping sub-frame supported adjacent one end by ground engaging wheels and adapted to be supported adjacent the other end of the tractor, said sub-frame having a first frame portion and a second frame portion, said first and second frame portions defining an opening therebetween, said second frame portion being connected to said first frame portion for longitudinal movement relative thereto, a first downwardly extending bracket secured to said first frame portion closely adjacent the tractor, a second downwardly extending bracket secured to said second frame portion closely adjacent said wheels, a load supporting member disposed above said sub-frame, elevating mechanism interconnecting said sub-frame and said load supporting member including first and second lever arms, said first lever arm being pivotally connected adjacent the lower end thereof to said first bracket and connected adjacent the upper end thereof to said load supporting member for pivotal and longitudinal movement relative thereto and said second lever arm being pivotally connected adjacent the lower end thereof to said second bracket and pivotally connected adjacent the upper end thereof to said load supporting member so that when said mechanism is collapsed it is disposed within said opening and said load supporting member is supported upon said sub-frame, and means interconnecting said first and second frame portions for moving said second frame portion longitudinally relative to said first frame portion, whereby said load supporting member is elevatable relative to said sub-frame and is maintained parallel relative thereto during elevation and the moment arm between said wheels and the lower end of said second lever arm remains constant.

References Cited in the file of this patent

UNITED STATES PATENTS

| | | |
|---|---|---|
| 1,525,857 | Eidmann | Feb. 10, 1925 |
| 1,564,713 | Reiter | Dec. 8, 1925 |
| 2,519,002 | Stemin et al. | Aug. 15, 1950 |
| 2,676,783 | Rogers | Apr. 27, 1954 |
| 2,706,102 | Cresci | Apr. 12, 1955 |
| 2,833,587 | Saunders | May 6, 1958 |
| 2,976,912 | Dias | Mar. 28, 1961 |
| 3,032,319 | Dale | May 1, 1962 |

FOREIGN PATENTS

| | | |
|---|---|---|
| 217,478 | Australia | Oct. 8, 1958 |

UNITED STATES PATENT OFFICE
CERTIFICATE OF CORRECTION

Patent No. 3,105,673　　　　　　　　　　　　　　　October 1, 1963

William A. Williamson

It is hereby certified that error appears in the above numbered patent requiring correction and that the said Letters Patent should read as corrected below.

Column 4, line 22, for "about" read -- above --.

Signed and sealed this 7th day of April 1964.

(SEAL)
Attest:

ERNEST W. SWIDER
Attesting Officer

EDWARD J. BRENNER
Commissioner of Patents